(12) United States Patent
Li et al.

(10) Patent No.: US 8,798,145 B2
(45) Date of Patent: Aug. 5, 2014

(54) METHODS FOR ERROR CONCEALMENT DUE TO ENHANCEMENT LAYER PACKET LOSS IN SCALABLE VIDEO CODING (SVC) DECODING

(75) Inventors: John Qiang Li, Belle Mead, NJ (US); Zhenyu Wu, Plainsboro, NJ (US); Xiuping Lu, Hillsborough, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 332 days.

(21) Appl. No.: 12/737,497

(22) PCT Filed: Jul. 21, 2009

(86) PCT No.: PCT/US2009/004233
§ 371 (c)(1),
(2), (4) Date: Jan. 20, 2011

(87) PCT Pub. No.: WO2010/011295
PCT Pub. Date: Jan. 28, 2010

(65) Prior Publication Data
US 2011/0122945 A1 May 26, 2011

Related U.S. Application Data

(60) Provisional application No. 61/082,521, filed on Jul. 22, 2008.

(51) Int. Cl.
*H04N 7/12* (2006.01)
*H04N 7/26* (2006.01)
*H04N 7/46* (2006.01)
*H04N 7/68* (2006.01)

(52) U.S. Cl.
CPC ... *H04N 19/00321* (2013.01); *H04N 19/00284* (2013.01); *H04N 19/00757* (2013.01); *H04N 19/00436* (2013.01); *H04N 19/00939* (2013.01)
USPC .................................. 375/240.12

(58) Field of Classification Search
CPC ......................................................... H04N 7/64
See application file for complete search history.

(56) References Cited

U.S. PATENT DOCUMENTS 5,742,892 A 4/1998 Chaddha
6,816,194 B2 11/2004 Zhang et al.
(Continued)

FOREIGN PATENT DOCUMENTS

EP  1775954 A1  4/2007
JP  2004-112472  4/2004
(Continued)

OTHER PUBLICATIONS

Chen Y et al. "Frame loss error concealment for SVC" ITU Study Group 16-Video coding experts group ISO-IEC MPEG and ITU-T VCEG (ISO/IEC JTC1/SC29/WG11 and ITU-T SG16 Q6) No. JVT-Q046, Oct. 12, 2005, 17th Meeting: Nice, France.

(Continued)

*Primary Examiner* — Sath V Perungavoor
*Assistant Examiner* — Kate Luo
(74) *Attorney, Agent, or Firm* — Robert D. Shedd; Reitseng Lin

(57) ABSTRACT

Methods for concealing Scalable Video Coding (SVC) decoding errors. Lost pictures in the target layer are replaced with up-sampled pictures from a lower layer, such as the base layer. In multiloop decoding applications, lost pictures in the target layer are replaced with corresponding up-sampled pictures from the lower layer. Subsequent target layer pictures in the same Group of Pictures (GOP) are either replaced with corresponding upsampled pictures from the lower layer, or they are decoded with up-sampled pictures from the lower layer used as reference pictures. For single-loop decoding, the bit stream of each layer is buffered, for each GOP, and inspected for errors. If an error is detected in the target layer, the pictures of the highest level layer without an error are decoded and up-sampled and used as the output pictures for the current GOP.

16 Claims, 3 Drawing Sheets

(56) References Cited

U.S. PATENT DOCUMENTS

| | | | |
|---|---|---|---|
| 2003/0012284 A1* | 1/2003 | Kazayama et al. | 375/240.25 |
| 2005/0147164 A1 | 7/2005 | Wu et al. | |
| 2007/0269181 A1* | 11/2007 | Kikuchi | 386/68 |
| 2008/0232470 A1 | 9/2008 | Park et al. | |
| 2009/0016447 A1 | 1/2009 | Chen et al. | |

FOREIGN PATENT DOCUMENTS

| | | | |
|---|---|---|---|
| WO | WO 2007/043793 A1 | 4/2007 | |
| WO | WO 2007/080477 A2 | 7/2007 | |
| WO | WO 2008/088305 A2 | 7/2008 | |

OTHER PUBLICATIONS

J. Reichel et al. "Joint scalable video model JSVM-4" ITU Study Group 16—Video coding experts group—ISO/IEC MPEG & ITU-T VCEG (ISO/IEC JTC1/SC29/WG11 and ITU-T SG16 Q6), No. JVT-Q202, Oct. 12, 2005, Figure 1, section 1.2.1, section 2.3 and section 4.1.4, 17th Meeting: Nice, France.

Chen, et al., "Frame loss error concealment for SVC", Journal of Zhejiang University Science A, ISSN 1009-3095, 2006, pp. 677-683.

Kim, et al., "Directional Filtering for Upsampling According to Direction Information of the Base Layer in the JVT/SVC Codec", ACIVS 2006, LNCS 4179, pp. 1-11, 2006.

International Search Report, Aug. 31, 2009.

Aign, S. et al.: "Temporal & Spatial Error Concealment Techniques for Hierarchical MPEG-2 Video Codec", Communications—Gateway to Globalization; Proceedings of the International Conference on Communications, Seattle, Jun. 18-22, 1995; [Proceedings of the International Conference on Communications ICC)], New York, IEEE, U.S., vol. 3, Jun. 18, 1995, pp. 1778-1783, XP000535053.

* cited by examiner

US 8,798,145 B2

METHODS FOR ERROR CONCEALMENT DUE TO ENHANCEMENT LAYER PACKET LOSS IN SCALABLE VIDEO CODING (SVC) DECODING

RELATED PATENT APPLICATIONS

This application claims the benefit, under 35 U.S.C. §365 of International Application PCT/US2009/004233, filed Jul. 21, 2009, which was published in accordance with PCT Article 21(2) on Jan. 28, 2010 in English and which claims the benefit of U.S. provisional patent application No. 61/082521, filed Jul. 22, 2008.

FIELD OF INVENTION

The present invention generally relates to the communication of video data, particularly to the handling of errors in scalable video coding video data.

BACKGROUND

Scalable Video Coding (SVC) has many advantages over classical Advanced Video Coding (AVC) (see, e.g., ITU-T Recommendation H.264 Amendment 3: "Advanced video coding for generic audiovisual services: Scalable Video Coding"). Scalability in SVC can apply to the temporal, spatial and quality (signal-to-noise ratio) domains. An SVC stream usually comprises one base layer and one or more enhancement layers. The base layer stream can be independently decoded but any enhancement layers can only be decoded together with the base layer and other dependent enhancement layers.

An advantage of SVC encoding is that the different layers can be transmitted in different IP streams and thus can be protected against transmission errors using different methods. For example, the base layer is more important than the enhancement layers and thus may receive greater protection. On the other hand, due to bandwidth limitations, enhancement layers are usually less well protected than the base layer, thereby making packet loss in an enhancement layer more likely than packet loss in the base layer.

When there is packet loss in an enhancement layer, the corresponding pictures in that layer and in the enhancement layers up to the target layer (the highest level layer needed to provide a target resolution), cannot be decoded. Traditional error concealment methods usually replace a lost picture by duplicating the picture of the previous frame or by interpolating several good neighboring frames. These methods usually render poor picture quality when the differences between the neighboring frames are large, such as in the case of a scene change in the lost frame.

SUMMARY

In accordance with the principles of the invention, methods for concealing Scalable Video Coding (SVC) decoding errors when there is packet loss in an enhancement layer are described herein. Illustratively, several ways are described to replace lost pictures in the target layer with up-sampled pictures from a lower layer, such as the base layer. Exemplary methods are described for single-loop as well as multi-loop decoding.

In accordance with the principles of the invention, the viewing quality of a decoded picture can be improved when packet loss occurs in an enhancement layer.

In view of the above, and as will be apparent from reading the detailed description, other embodiments and features are also possible and fall within the principles of the invention.

BRIEF DESCRIPTION OF THE FIGURES

Some embodiments of apparatus and/or methods in accordance with embodiments of the present invention are now described, by way of example only, and with reference to the accompanying figures in which.

DESCRIPTION OF EMBODIMENTS

Figure 1:
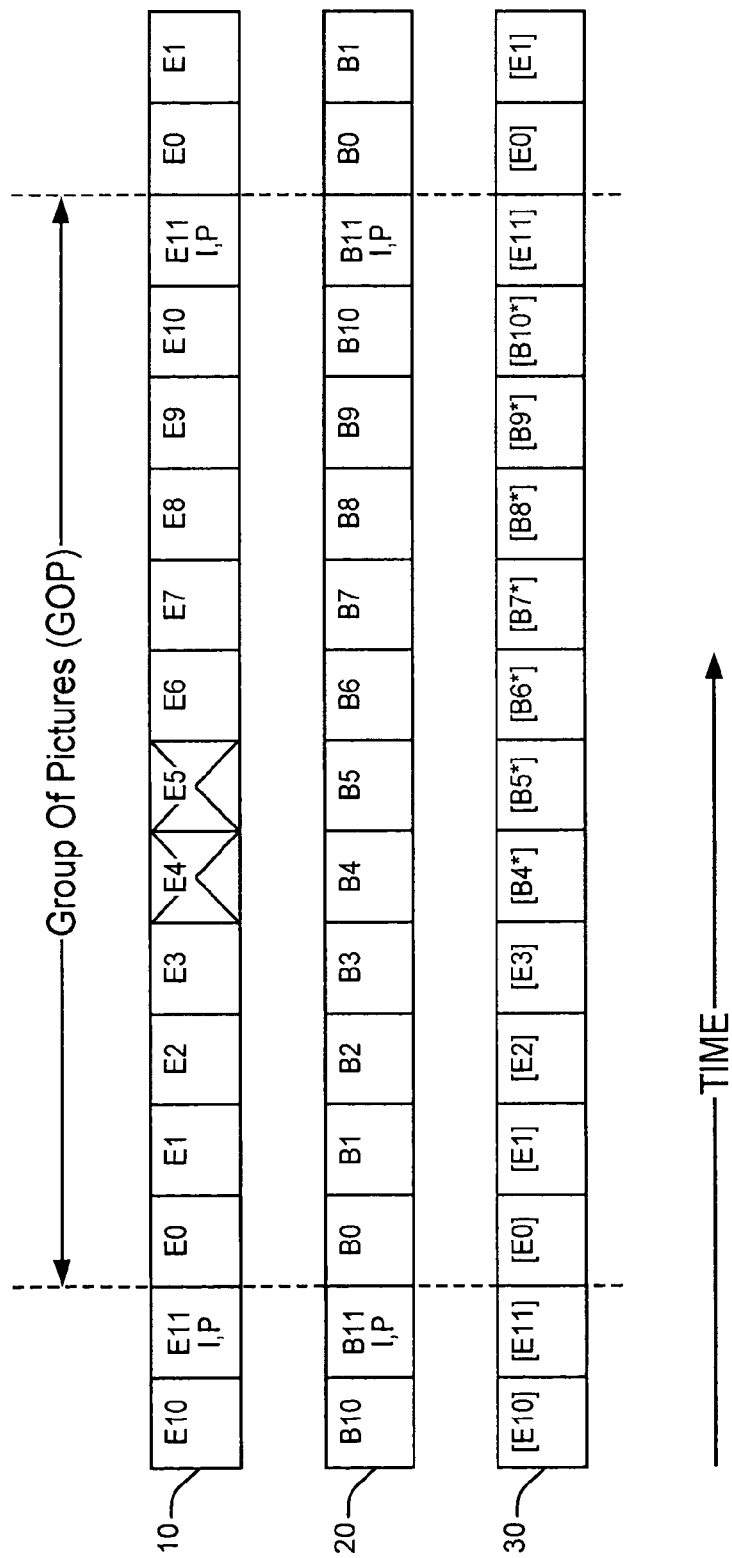
FIG. 1 illustrates the handling of enhancement layer packet loss in accordance with a first exemplary method of the invention.

Other than the inventive concept, the elements shown in the figures are well known and will not be described in detail. For example, other than the inventive concept, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC), Chinese Digital Television System (GB) 20600-2006 and DVB-H is assumed. Likewise, other than the inventive concept, other transmission concepts such as eight-level vestigial sideband (8-VSB), Quadrature Amplitude Modulation (QAM), and receiver components such as a radio-frequency (RF) front-end (such as a low noise block, tuners, down converters, etc.), demodulators, correlators, leak integrators and squarers is assumed. Further, other than the inventive concept, familiarity with protocols such as Internet Protocol (IP), Real-time Transport Protocol (RTP), RTP Control Protocol (RTCP), User Datagram Protocol (UDP), is assumed and not described herein. Similarly, other than the inventive concept, familiarity with formatting and encoding methods such as Moving Picture Expert Group (MPEG)-2 Systems Standard (ISO/IEC 13818-1), H.264 Advanced Video Coding (AVC) and Scalable Video Coding (SVC) is assumed and not described herein. It should also be noted that the inventive concept may be implemented using conventional programming techniques, which, as such, will not be described herein. Finally, like-numbers on the figures represent similar elements.

In decoding an SVC video stream, at any given time, several decoded reference pictures—pictures used in predicting other pictures—are temporarily stored in a decoded picture buffer. In single-loop decoding, only the target layer's decoded reference pictures are maintained in the decoded picture buffer. In multi-loop decoding, the decoded reference pictures for all layers are maintained in the decoded picture buffer.

In SVC, frames or pictures are arranged in groups, each of which is referred to as a Group of Pictures (GOP). Each GOP may include Intra Pictures (I-Pictures), Predicted Pictures (P-Pictures), and/or Bidirectional Pictures (B-Pictures). I-pictures can be decoded without reference to any other pictures. P- and B-pictures can only be properly decoded with reference to other I-, P- or B-pictures. Each GOP starts or ends with a key frame. A key frame can be an I-picture or a P-picture. P- and B-pictures within a GOP are decoded with reference to the key frame of the GOP and the key frame of the preceding GOP. As such, errors in a key frame can propagate forward to affect multiple GOPs, particularly if there is a long string of key frames that are P-pictures.

When an enhancement layer packet or packets are lost, the lost frames and the subsequent frames in the corresponding GOP are usually impacted by the loss and should preferably be concealed to minimize degradation of the picture displayed to the user. For multi-loop decoding, two exemplary methods in accordance with the invention will now be described for replacing the lost frames and the subsequent frames in the GOP when an enhancement layer packet loss occurs.

FIG. 1 illustrates a first exemplary method of handling enhancement layer packet losses for multi-loop decoding of a spatially scalable SVC video stream. In the method of FIG. 1, in which it is assumed that each GOP ends with a key frame, when packet loss occurs in the target layer, the lost frames corresponding to the lost packets and all subsequent frames within the same GOP, with the exception of the key frame, are replaced with up-sampled frames of the highest layer without packet loss. As a result, the rest of the target layer packets following the lost packet(s) are ignored until the key frame of the GOP.

FIG. 1 shows an illustrative scenario for an SVC stream in which there is one enhancement layer, the target layer, and the base layer. A stream 10 of enhancement layer packets and a stream 20 of base layer packets are provided to an SVC decoder. The decoder output is shown as a stream of pictures 30.

As shown in FIG. 1, the blocks labeled Bi represent base layer packets and the blocks labeled Ei represent enhancement layer packets. Each block Bi, Ei may represent a Network Abstraction Layer (NAL) access unit comprising one packet or multiple packets. The blocks labeled [Bi] and [Ei] represent pictures generated by decoding the corresponding blocks of base and enhancement layer packets, respectively. Note that because enhancement layer pictures can only be decoded in conjunction with the corresponding base layer pictures, picture [Ei] is generated by decoding enhancement layer packet block Ei in conjunction with base layer picture [Bi]. In other words, [Ei] is a function of Ei and corresponding base layer picture [Bi].

Each block labeled [Bi*] represents an up-sampled [Bi] picture. The up-sampled pictures [Bi*] will have the same resolution and frame rate as the corresponding enhancement layer pictures [Ei]. In a spatially scalable SVC implementation as illustrated, the frame rates of the base and enhancement layer pictures will be the same, but the resolutions will be different. As such, up-sampling of a base layer picture will entail increasing its resolution, such as by interpolation, to that of the target enhancement layer. The up-sampling can be performed using known techniques.

In the scenario illustrated in FIG. 1, enhancement layer packets in blocks E4 and E5 of stream 10 are lost in transit or received in error at the decoder. Until this point in the current GOP, the decoder has output pictures [E0]-[E3], decoded with the enhancement layer packets received successfully thus far. Upon the packet loss in E4 and E5, however, the decoder switches its output to the up-sampled base layer pictures [B4*] through [B10*], as shown in FIG. 1. As such, instead of outputting pictures [E4]-[E10] until the key frame of the current GOP, the decoder outputs up-sampled base layer pictures [B4*] through [B10*]. Note that in the illustrated scenario, the key picture [E11] of the enhancement layer is not replaced by an up-sampled base layer picture. If the enhancement layer key picture [E11] is an I-picture, unless it was lost or received in error, it will provide a better picture than [B11*]. If the enhancement layer key picture [E11] is a P-picture, its accurate decoding will depend on the key picture of the preceding GOP. If the current key picture [E11] and the key picture of the preceding GOP were received successfully, and there is no error propagating forward from an earlier key picture, then the key picture [E11] will provide a better picture than [B11*] and is thus used. Otherwise, [B11*] is used instead. At the beginning of the next GOP, the decoder continues generating pictures decoded with enhancement layer packets.

As mentioned above, if an error occurs in a key picture of a GOP, it can propagate forward to corrupt pictures in subsequent GOPs. A key picture that is a P-picture will depend on the previous key picture, in which case an error in a key picture will propagate forward to corrupt multiple GOPs until a key picture that is an I-picture is encountered. In an exemplary embodiment, if an error is detected in a key frame of the target layer (i.e., in block E11), up-sampled pictures of the highest level without error are used for the output picture stream 30 until an I-picture is received as a key frame in the target layer. At that point, the propagation forward of any error in the target layer will have stopped. As such, until an I-picture key frame is received in the target layer, the target layer data is essentially ignored and can be discarded.

In an alternative embodiment, instead of ignoring all target layer data until an I-picture key frame is received, target layer pictures can be generated, starting with the next GOP, using the target layer data (E0, E1, . . . ) received in the next GOP with [B11*], the up-sampled key picture in the base layer of the current GOP, as a reference picture.

Packet losses can be detected by any of a variety of suitable methods. In an exemplary embodiment, missing packets can be detected by examining RTP sequence numbers in the headers of RTP packets carrying the corresponding SVC stream. A gap in the RTP sequence numbers of packets received would indicate the loss of one or more packets. See, e.g., U.S. Patent Application Publication No. 2009/0016447, incorporated herein by reference in its entirety.

Note that while the scenario shown in FIG. 1 is for a two-layer implementation, in which the target layer is the first enhancement layer, the exemplary method can be readily extended to handle SVC streams with three or more layers. In accordance with such an implementation, when packet loss occurs in the target layer, the lost pictures and subsequent pictures until the key picture of the current GOP are replaced by the corresponding up-sampled pictures from the highest layer not experiencing packet loss. Thus, for example, in a four-layer application, if the second and third enhancement layers experience losses, but the first enhancement layer does not, the lost and subsequent pictures preceding the key picture of the current GOP are replaced with corresponding up-sampled pictures from the first enhancement layer. In this example, pictures from the first enhancement layer are up-sampled to the resolution of the third enhancement layer, the target layer.

Figure 2:
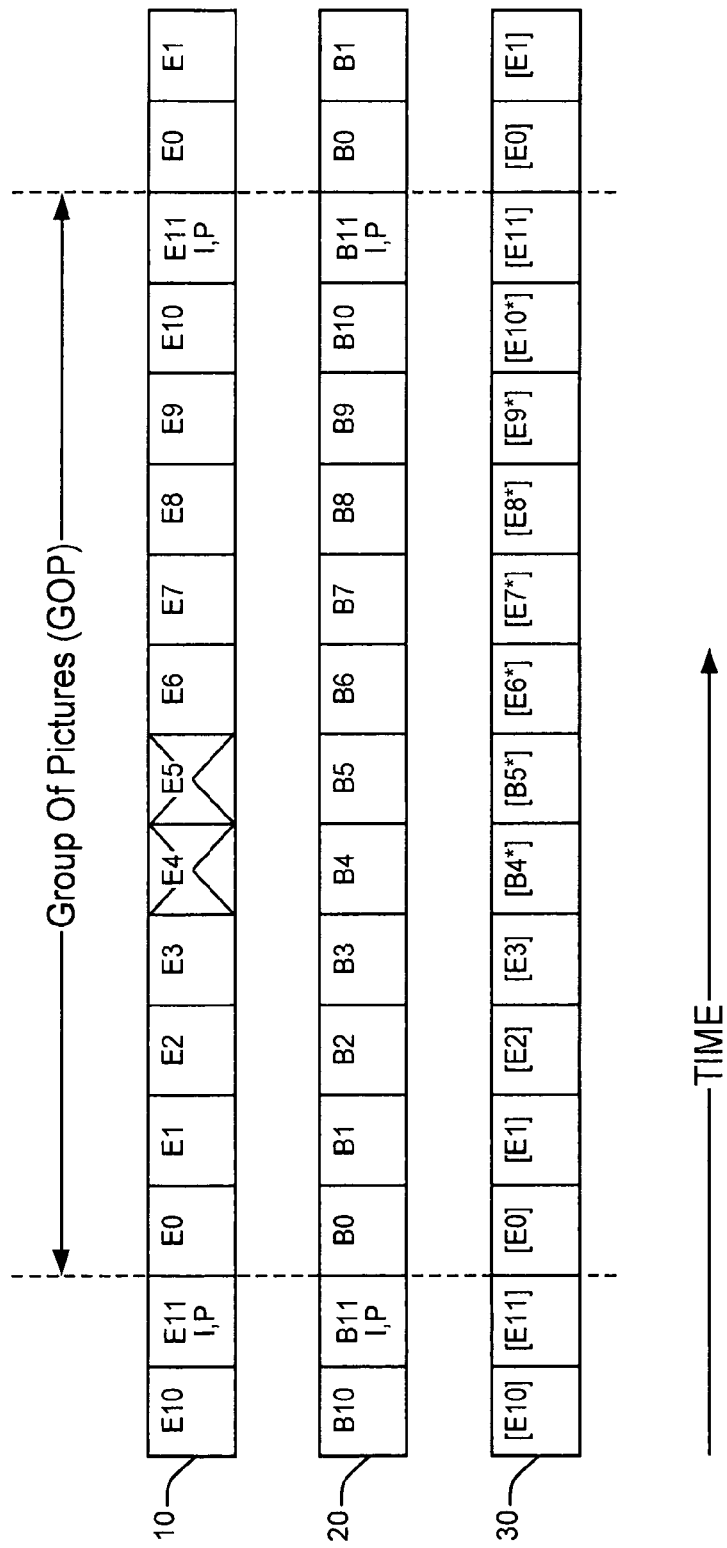
FIG. 2 illustrates the handling of enhancement layer packet loss in accordance with a second exemplary method of the invention.

FIG. 2 illustrates a second exemplary method of handling enhancement layer packet losses for multi-loop decoding of spatially scalable SVC video. In the method of FIG. 2, in which each GOP ends with a key frame, when packet loss occurs in the target layer, the pictures thus lost are replaced with the corresponding up-sampled pictures of the highest layer without packet loss. The subsequent pictures preceding the key picture of the current GOP are generated by decoding the subsequent target layer pictures after placing the aforementioned up-sampled lower layer frames in the target layer's reference picture queue.

As shown in FIG. 2 for a two-layer scenario, up-sampled base layer frames [B4*] and [B5*] are used to replace the lost enhancement layer pictures [E4] and [E5]. [E6*] through [E10*] are the decoded pictures based on the enhancement layer packets in blocks E6 through E10 and the past reference pictures including [B4*] and [B5*].

As in the embodiment illustrated in FIG. 1, the key picture [E11] of the enhancement layer is not replaced in the scenario of FIG. 2. If the enhancement layer key picture [E11] is an I-picture, unless it was lost or received in error, it will provide a better picture than an enhancement layer picture [E11*] based on an up-sampled base layer reference picture. If the enhancement layer key picture [E11] is a P-picture, its accurate decoding will depend on the key picture of the preceding GOP. If the current key picture [E11] and the key picture of the preceding GOP were received successfully, and there is no error propagating forward from an earlier key picture, then the key picture [E11] will provide a better picture than [E11*] and is thus used. Otherwise, [E11*] is used instead. At the beginning of the next GOP, the decoder continues generating pictures decoded with enhancement layer packets.

Note that while the scenario shown in FIG. 2 is for a two-layer implementation, in which the target layer is the first enhancement layer, the exemplary method can be readily extended to handle SVC streams with three or more layers. Thus, for example, in a four-layer application, if the second and third enhancement layers experience losses, but the first enhancement layer does not, the lost pictures within the current GOP are replaced with the corresponding up-sampled pictures from the first enhancement layer and the subsequent frames in the GOP are generated by decoding the subsequent pictures in the third enhancement layers pictures after placing the aforementioned up-sampled first enhancement layer frames in the third enhancement layer's reference picture queue.

For single-loop SVC decoding, a further exemplary method can be used. In single-loop decoding, only target layer pictures are constructed. In a two-layer scheme, base layer pictures are not constructed. In accordance with an exemplary method for a two-layer application, the SVC bit streams of both the base layer and the enhancement layer for an entire GOP are buffered at the beginning of each GOP and inspected.

If inspection of the buffered bit streams reveals no losses, the decoder will decode as usual. However, if there is packet loss in the enhancement layer, the entire enhancement layer in that GOP will be ignored. The decoder will decode only the base layer, up-sample the base layer pictures thus generated, and use the up-sampled base layer pictures to replace the enhancement layer pictures. The base layer, in effect, becomes the target layer. If the original SVC stream was generated in conformance with SVC standards, the remaining stream will be a standard-conforming stream and thus any standard-conforming SVC decoder should be able to decode it.

Figure 3:
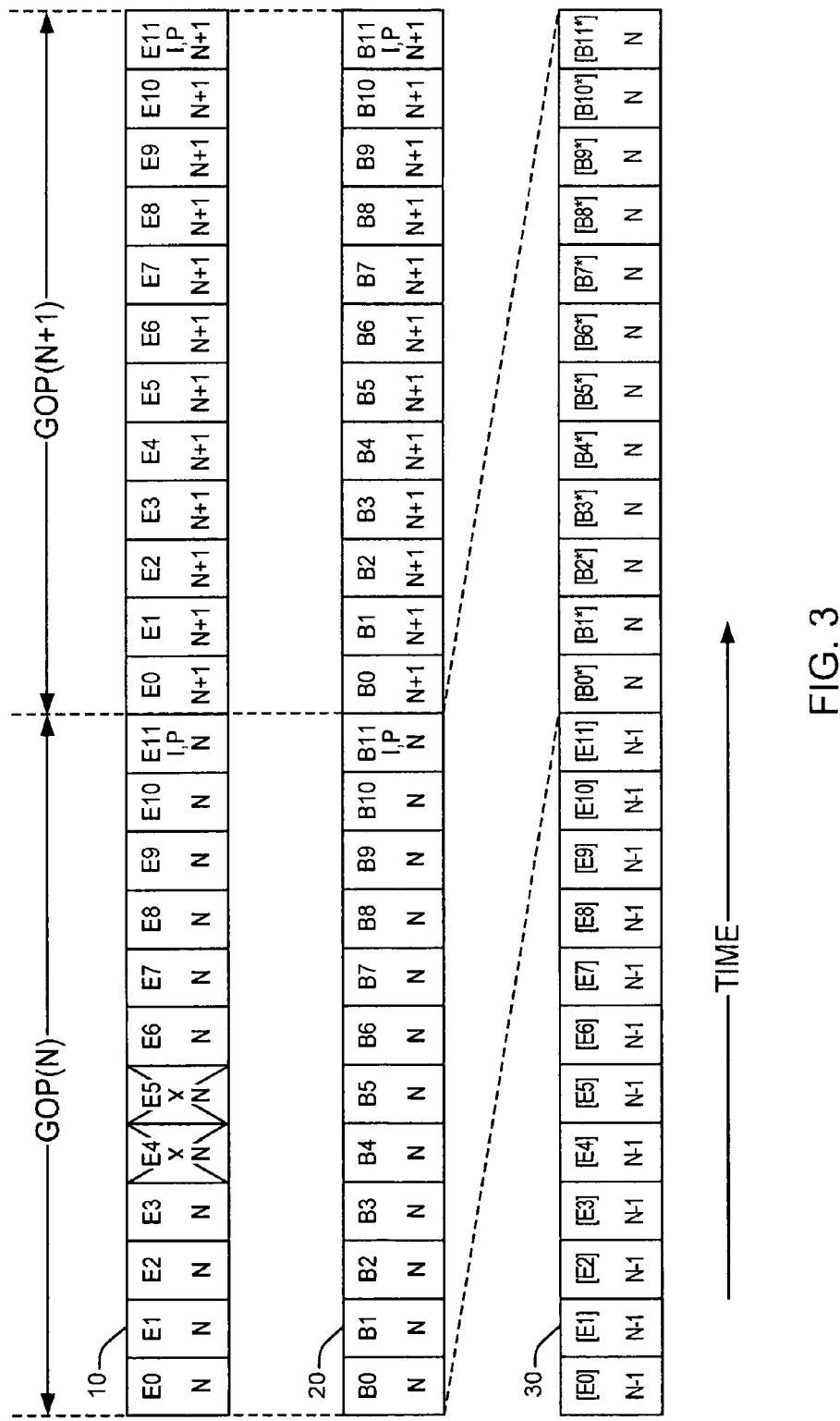
FIG. 3 illustrates the handling of enhancement layer packet loss in accordance with a third exemplary method of the invention.

FIG. 3 illustrates the aforementioned single-loop method for a two-layer implementation in which each GOP ends with a key frame. In the scenario illustrated in FIG. 3, enhancement layer packets in blocks E4 and E5 in GOP(N) of stream 10 are lost in transit or received in error at the decoder. As such, instead of generating pictures [E0]-[E11] for GOP(N) in stream 30, base layer pictures [B0]-[B11] are generated and up-sampled to output pictures [B0*]-[B11*] in stream 30 for GOP(N).

Note that the change in the decoded picture output stream 30 happens at a GOP boundary. The packets not necessary for generating the output picture stream 30 can be discarded, whereas the packets to be used for generating the output picture stream 30 are decoded. As such, in the scenario illustrated, the enhancement layer packets (E0-E11) for GOP(N), which were buffered as described above, can be overwritten with the enhancement layer packets for GOP(N+1) as they are received. The buffered base layer packets (B0-B11) for GOP (N) are decoded and up-sampled to generate pictures [B0*]-[B11*] for the output picture stream 30.

While the exemplary method described above with reference to FIG. 3 refers to SVC video streams with a base layer and one enhancement layer, the method can be readily extended for applications with multiple enhancement layers. In such applications, if the target layer experience losses, it is replaced as the target layer by the highest level layer with no losses. The pictures of the new target layer for the entire GOP are decoded and up-sampled to the resolution and frame rate of the original target layer. Thus, for example, in an SVC stream with three enhancement layers, if the second and third enhancement layers experience packet losses, up-sampled pictures from the first enhancement layer would be output instead.

As mentioned above, if an error occurs in a key picture of a GOP, it can propagate forward to corrupt pictures in subsequent GOPs. A key picture that is a P-picture will depend on the previous key picture, in which case an error in a key picture will propagate forward to corrupt multiple GOPs until a key picture that is an I-picture is encountered. In an exemplary embodiment, if an error is detected in a key frame of the target layer (i.e., in block E11), up-sampled pictures of the highest level without error are used for the output picture stream 30 until an I-picture is received as a key frame in the target layer. At that point, the propagation forward of any error in the target layer will have stopped. As such, until an I-picture key frame is received in the target layer, the target layer data is essentially ignored and can be discarded.

There are several approaches for identifying GOP boundaries without decoding any frames. One approach entails inspecting packet header information. Each coded video packet typically includes a Network Abstraction Layer (NAL) header containing information indicating the temporal, spatial and/or quality scalability levels. By parsing the first few bytes of the header, key pictures can be identified as those having 0 for each of the scalability levels. As mentioned above, a new GOP starts after or ends with each key picture.

Another approach entails the use of different delivery paths for key frames. Due to their different levels of importance, different video layers are often sent using different connection paths (e.g., different IP addresses and/or ports). If key pictures are sent in a separate path than the non-key pictures, then it is straightforward to identify them.

In another approach, if a video stream is encoded with a fixed GOP pattern known by the decoder a priori or by other external means (e.g., out-of-band signaling), then the decoder can use the information to identify the key pictures.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, the inventive concept may be implemented in a stored-program-controlled processor, e.g., a digital signal processor, which executes associated software for carrying out a method in accordance with the principles of the invention. Further, the principles of the invention are applicable to different types of communications systems, e.g., satellite, Wireless-Fidelity (Wi-Fi), cellular, etc. Indeed, the inventive principals are applicable to stationary as well as mobile receivers. It is therefore to be understood that numerous modifications may be made to the illustrative embodiments and that other arrangements may be devised without departing from the spirit and scope of the present invention.

The invention claimed is:

1. A method of decoding a digital video signal transmitted in first and second layers, wherein the second layer comprises information for enhancing video of the first layer, the method comprising:
    generating at least one first layer frame by decoding information in the first layer;
    detecting an error in the second layer; and
    generating a plurality of output frames by up-sampling corresponding first layer frames,
    wherein:
        the digital video signal includes a plurality of groups of pictures, wherein each group of pictures ends with a key frame,
        the error in the second layer occurs at least two frames before the key frame and is followed by at least one second layer frame with no error which precedes the key frame, and
        the step of generating a plurality of output frames includes up-sampling those first layer frames corresponding to the second layer frames containing the error and to all second layer frames which follow the frame containing the error and which precede the key frame of the group of pictures in which the error is detected.

2. The method of claim 1, wherein up-sampling a first layer frame includes converting said frame to have the same resolution as a frame in the second layer.

3. The method of claim 1, wherein the first layer is a base layer and the second layer is an enhancement layer.

4. The method of claim 1, wherein the key frame of the group of pictures in which the error is detected is error free and the step of generating at least one output frame includes decoding said key frame.

5. The method of claim 1, wherein the key frame of the group of pictures in which the error is detected includes an error and the step of generating a plurality of output frames includes up-sampling first layer frames corresponding to second layer frames through the end of the group of pictures in which the error is detected.

6. The method of claim 5, wherein the step of generating a plurality of output frames includes up-sampling first layer frames corresponding to second layer frames until an intra-coded key frame is detected in the second layer.

7. The method of claim 1, wherein the step of generating a plurality of output frames includes decoding information in the second layer following the error using up-sampled first layer frames as reference frames.

8. The method of claim 7, wherein the key frame of the group of pictures in which the error is detected is error free and the step of generating at least one output frame includes decoding said key frame.

9. The method of claim 1 comprising buffering information in the first layer for a group of pictures, wherein the step of generating at least one first layer frame includes decoding the buffered information.

10. The method of claim 9 comprising buffering information in the second layer for a group of pictures, wherein the step of detecting an error in the second layer includes inspecting the buffered information.

11. The method of claim 9 comprising identifying a boundary between groups of pictures.

12. The method of claim 11, wherein the step of identifying a boundary includes at least one of parsing header information, receiving key frames via a separate path, and receiving group of pictures pattern information.

13. The method of claim 9, wherein the step of generating a plurality of output frames includes up-sampling first layer frames corresponding to second layer frames until an intra-coded key frame is detected in the second layer.

14. The method of claim 1, wherein the method of decoding a digital video signal includes a multi-loop decoding method.

15. The method of claim 1, wherein the method of decoding a digital video signal includes a single-loop decoding method.

16. The method of claim 1, wherein each key frame is one of an intra-coded and a predictive frame.

* * * * *